(12) United States Patent
Chen et al.

(10) Patent No.: US 8,640,020 B2
(45) Date of Patent: Jan. 28, 2014

(54) ADJUSTABLE AND PROGRESSIVE MOBILE DEVICE STREET VIEW

(75) Inventors: Billy Chen, Bellevue, WA (US); Eyal Ofek, Redmond, WA (US); Michael Cohen, Seattle, WA (US); Johannes Kopf, Bellevue, WA (US); Casey Stein, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 12/792,047

(22) Filed: Jun. 2, 2010

(65) Prior Publication Data
US 2011/0302527 A1 Dec. 8, 2011

(51) Int. Cl.
*G06F 17/00* (2006.01)
(52) U.S. Cl.
USPC .................... 715/203; 345/420; 345/634
(58) Field of Classification Search
USPC .................. 345/420, 637; 715/203
See application file for complete search history.

(56) References Cited

U.S. PATENT DOCUMENTS

| | | | | |
|---|---|---|---|---|
| 5,572,643 | A * | 11/1996 | Judson | 709/218 |
| 6,157,933 | A * | 12/2000 | Celi et al. | 715/234 |
| 6,430,501 | B1 | 8/2002 | Slominski | |
| 7,284,187 | B1 * | 10/2007 | Corboy | 715/203 |
| 7,548,814 | B2 * | 6/2009 | Pantalone et al. | 701/212 |
| 2007/0080830 | A1 * | 4/2007 | Sacks | 340/995.1 |
| 2008/0043020 | A1 | 2/2008 | Snow et al. | |
| 2009/0079830 | A1 | 3/2009 | Ekpar | |
| 2009/0190857 | A1 * | 7/2009 | Epshtein et al. | 382/276 |
| 2009/0303231 | A1 * | 12/2009 | Robinet et al. | 345/419 |
| 2010/0045703 | A1 * | 2/2010 | Kornmann et al. | 345/653 |
| 2010/0094548 | A1 | 4/2010 | Tadman et al. | |

OTHER PUBLICATIONS

"T-Mobile Motorola Cliq Phone", REtrieved at << http://www.alibaba.com/buyofferdetail/102889937/T_Mobile_Motorola_Cliq_Phone_.html >>, Jan. 1, 2010, pp. 1-3.
Johnson, et al., "Palm Pre Gesture Guide—How to use Gestures to Control Zoom, Drag and Drop, Highlight, and other Features", Retrieved at << http://www.brighthub.com/mobile/palm/articles/41625.aspx >>, Jan. 20, 2010, pp. 1-3.
Park, Will, "Google Maps Update works with HTC HD2's Digital Compass", Retrieved at << http://www.intomobile.com/2009/12/09/google-maps-update-works-with-htc-hd2s-digital-compass.html >>, Dec. 9, 2009, pp. 1-5.
"T-Mobile G1 (black) Smartphone Reviews—CNET Reviews", Retireved at << http://reviews.cnet.com/smartphones/t-mobile-g1-black/4505-6452_7-33283585.html >>, Editor: Kent German, Oct. 22, 2008, pp. 1-6.

(Continued)

*Primary Examiner* — William Bashore
*Assistant Examiner* — Gregory A Distefano
(74) *Attorney, Agent, or Firm* — Turk IP Law, LLC (57) ABSTRACT

Intuitive and user-friendly user interface (UI) techniques are provided for navigating street view applications on a mobile device enabling users to view different angles and segments of available street level images. Additionally, retrieval and presentation of street view images are managed to mitigate delays in retrieval of desired images from a server over wireless connections through techniques such as textual representations, replacement views, scheduling image requests, and comparable ones.

17 Claims, 8 Drawing Sheets

(56) References Cited

OTHER PUBLICATIONS

Kargl, et al., "The iNAV Indoor Navigation System", Retrieved at << http://medien.informatik.uni-ulm.de/forschung/publikationen/ucs2007.pdf >>, vol. 4836, 2010, pp. 8.

Lazem, et al., "Prediction-Based Prefetching for Remote Rendering Streaming in Mobile Virtual Environments", Retrieved at << http://eprints.cs.vt.edu/archive/00000984/01/PredictionPrefetch-TR.pdf >>, Dec. 15-18, 2007, pp. 1-10.

* cited by examiner

ADJUSTABLE AND PROGRESSIVE MOBILE DEVICE STREET VIEW

BACKGROUND

Online mapping applications are an essential tool used frequently by many. Various alternative presentations such as satellite view, orthographic map, and comparable versions are provided by different hosted services. Some of those variations may even be superimposed. A recent development in online mapping services is street view, which enables users to view the surroundings of a particular location at the street level. In many applications, a default street level view of a given address is displayed upon receiving the address from the user. The user may then be enabled to rotate the viewing angle by selecting a rotation control. Many street view applications present a limited view of the location as captured from a mobile imaging unit (e.g. one or few buildings at a time).

Some mapping applications provide detailed information about specific addresses such as business names though user interface elements like balloons, hovering display boxes, etc. superimposed on a regular map or satellite view. While useful, the information is commonly not provided on a street view presentation.

Mapping applications may be especially useful when provided on a mobile device. For example, a user may be searching for a particular address and check on their mobile device the map or street view to find the address they are searching for. In many cases, communication bandwidth with mobile devices is limited, however, causing delays in retrieval of images for a street view (or similar application) by the mobile device. Hence, providing a high quality view of street surroundings promptly on a mobile device is a challenging endeavor.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing intuitive and user friendly user interface (UI) techniques for navigating street view applications on a mobile device enabling users to view different angles and segments of available street level images. Additionally, other embodiments are directed to managing retrieval and presentation of street view images (and portions thereof) to mitigate delays in retrieval of desired images from a server over wireless connections.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, retrieval and presentation of street view images may be managed to mitigate delays in retrieval of desired images from a server over wireless connections through techniques such as textual representations, replacement views, scheduling image requests, and comparable ones. Additionally, navigation of street view applications on a mobile device may be performed through intuitive and user-friendly UI techniques enabling users to view different angles and segments of available street level images. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing mapping operations in conjunction with mobile devices. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

Figure 1:
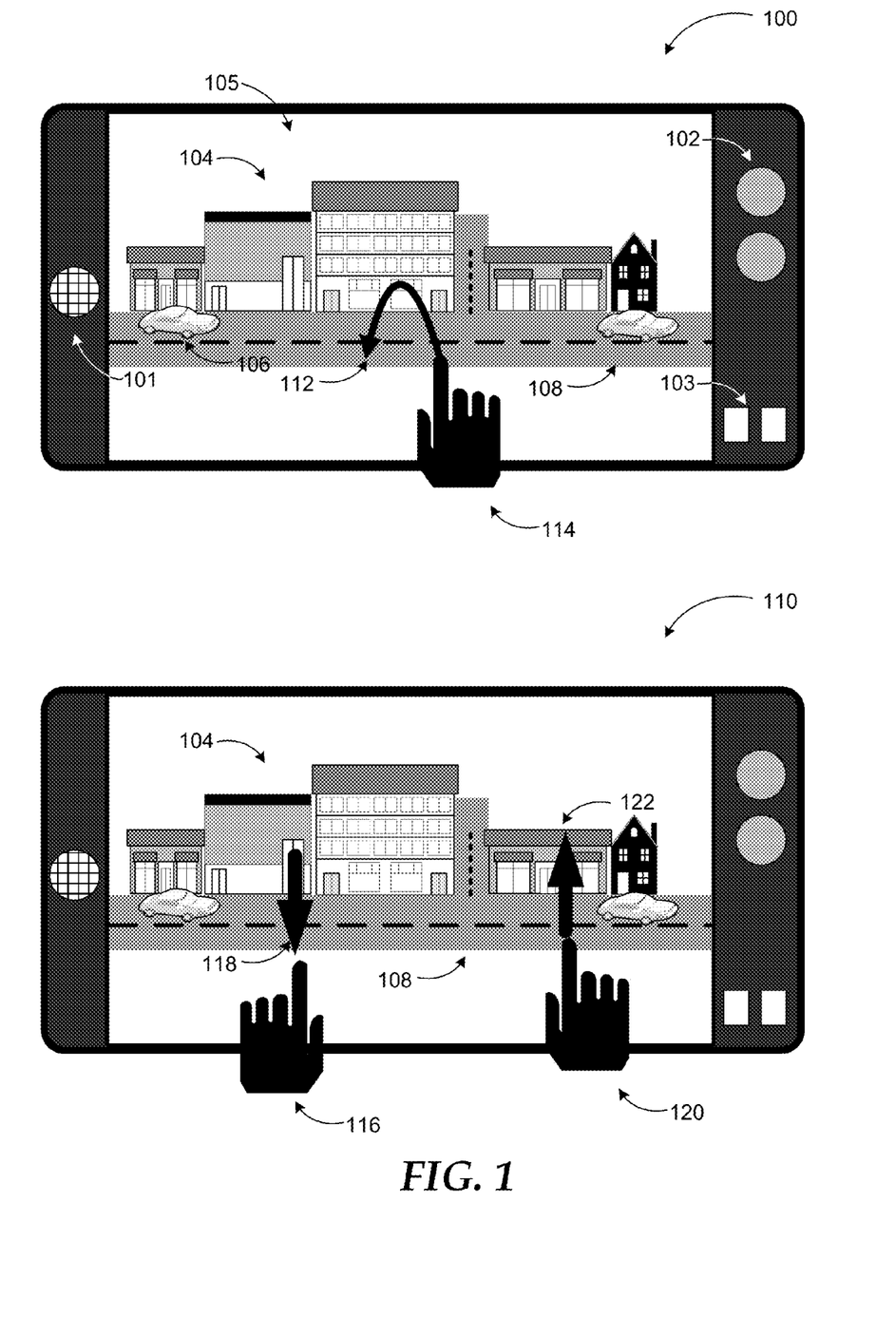
FIG. 1 illustrates two example street view navigation methods on a mobile device with touch-enabled display.

FIG. 1 illustrates two example street view navigation methods on a mobile device with touch-enabled display. A street view according to embodiments may include a panoramic street level view of the surroundings of a user-defined location. The location may be defined based on user input or automatic determination of the location based on Global Positioning Service (GPS) information, cellular tower triangulation, wireless data network node detection, and similar methods. While a mapping application providing a street view and user interface techniques for navigating the street view may be executed on any computing device, mobile devices such as smart phones, handheld computers, wireless Personal Digital Assistants (PDAs), mapping application enabled cellular phones, vehicle mount computing devices and similar ones may provide a more suitable environment for such an application.

Diagram 100 in FIG. 1 illustrates a smart phone with typical control elements such as buttons 102 and 103, speaker 101, and display 105. Display 105 may be a touch-sensitive display that responds to touch-based gestures (e.g. 112) by the user. Street view 104 presented on display 105 includes buildings on one side of a street 108, and vehicles 106.

According to some embodiments, user interface techniques for navigating in a street view map may include gesture-based techniques and hardware-input techniques. Gesture-based techniques may be specified by providing input gestures through a touch-enabled display of touch-sensitive input device on the mobile device in a single or multi-touch manner. While many gestures may be implemented a few example ones include: a single up-down gesture to perform a u-turn; a double-finger split up-down motions for revealing two sides of a street; and dragging in a turn arc to move down cross streets.

In diagram 100, the example up-down gesture 112 by the user's finger 114 is shown. This gesture may result in the displayed side of the street being flipped to the opposite side. Diagram 110 illustrates the example double-finger split up-down motions 118 and 122 (fingers 116 and 120), which may change the displayed side of the street 108 in an alternating manner. The gestures described herein may be provided by using fingers or artificial touch tools such as pens and similar ones.

Figure 2:
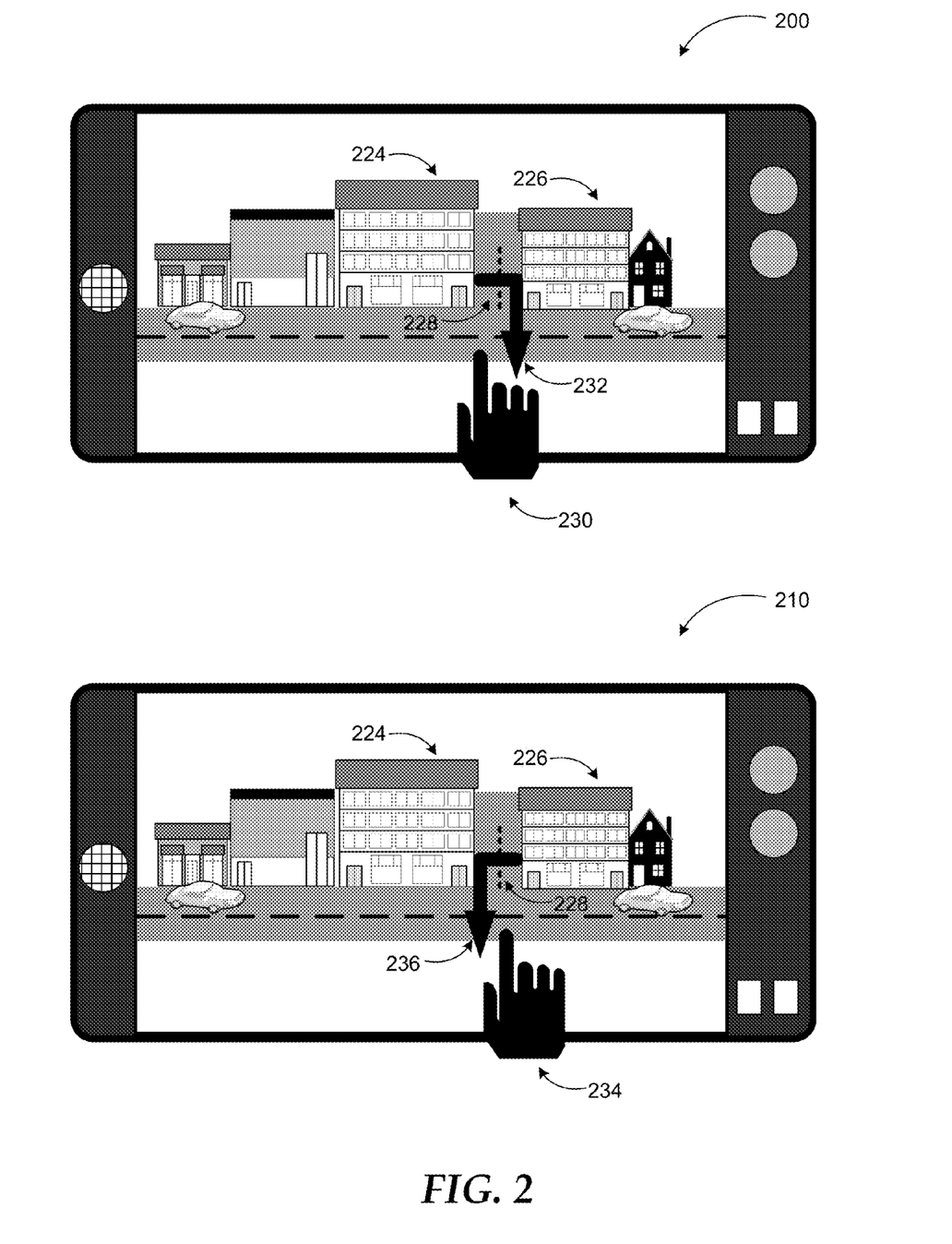
FIG. 2 illustrates two additional example street view navigation methods on a mobile device with touch-enabled display.

FIG. 2 illustrates two additional example street view navigation methods on a mobile device with touch-enabled display. Diagram 200 shows an example dragging in a turn arc gesture to move down and cross streets. In the example scenario, the gesture 232 by finger 230 results in the street view being changed to a view of street 228 looking toward building 224 (from a view point of building 226).

Diagram 210 illustrates the effects of the opposite dragging in a turn arc gesture 236 by finger 234, which may result in display of street 228 looking toward building 226 from the view point of building 224 at street level. Gestures and touches may also be area-based. For example, sliding along the top of the screen may rotate the view within a 360° panorama. Sliding the touch along the bottom of the camera may slide the view along the street.

Other navigation techniques may take advantage of hardware input, such as an accelerometer, a compass, and/or a trackball. Examples of such techniques may include tilting the phone to the side to slide up and down the street, tilting the phone up or down to see a top down map, and similar ones. As the user brings the mobile device to a horizontal position (i.e. looking toward the ground in the 360° display), the displayed street view may fade into a top map view that displays the area around the currently displayed location. Further hardware-based inputs may include rotating the mobile device about the vertical axis to see the other side of the street, rotating the mobile device to slide the viewer along the street, and comparable ones (employing the accelerometer of the mobile device). Additional input may be received from an integrated camera that sees the user. For example, the display may be moved based on the user's head motion to generate a motion parallel to the user's head motion to see a different portion of the street.

In a mobile device according to embodiments, the user may look down the street to see details that he cannot see from his point of view, but still maintain the relation to the correct view direction in the world. According to other embodiments, a snapshot of the view down the road may be taken and a street view slide of the street provided in response to touch inputs for particular locations on the displayed snapshot image.

TABLE 1

Example input mechanisms and gestures for actions in street view navigation.

| Inputs | Slide | Zoom to Bubble | Zoom to Slide | Turn in Bubble |
|---|---|---|---|---|
| Camera | Motion driven | | | |
| GPS | Location driven | | | |
| Cell Tower Signal | Location driven | | | |
| Wireless Network Signal | Location driven | | | |
| Compass | Orientation driven | | | |
| Accelerometer | Flick/tilt/push | Flick/tilt | Flick/tilt | Flick/tilt |
| Touch | Area-based, absolute/relative manipulation, tap, tap + hold, drag | Area-based, absolute/relative manipulation, tap, tap + hold, drag | Area-based, absolute/relative manipulation, tap, tap + hold, drag | Area-based, absolute/relative manipulation, tap, tap + hold, drag |
| Trackball | Roll (in any direction) | Roll (in any direction) | Roll (in any direction) | Roll (in any direction) |
| Microphone | Pitch, volume, speech | Pitch, volume, speech | Pitch, volume, speech | Pitch, volume, speech |

TABLE 1-continued

Example input mechanisms and gestures for actions in street view navigation.

| Inputs | Slide | Zoom to Bubble | Zoom to Slide | Turn in Bubble |
|---|---|---|---|---|
| Soft Keys | Relative motion | Zoom mode toggle | Zoom mode toggle | Fixed turning |

TABLE 2

Further example input mechanisms and gestures for actions in street view navigation.

| Inputs | U-turn | Left/right turns | Click on icon | Reveal other side |
|---|---|---|---|---|
| Camera | Motion driven | Motion driven | Motion driven | Motion driven |
| GPS | | | | |
| Cell Tower Signal | | | | |
| Wireless Network Signal | | | | |
| Compass | Orientation driven | Orientation driven | | Orientation driven |
| Accelerometer | Flick/tilt | Flick/tilt | Flick/tilt | Flick/tilt |
| Touch | Area-based, absolute/relative manipulation, tap, tap + hold, drag | Area-based, absolute/relative manipulation, tap, tap + hold, drag | Area-based, absolute/relative manipulation, tap, tap + hold, drag | Area-based, absolute/relative manipulation, tap, tap + hold, drag |
| Trackball | Roll (in circular direction) | Roll (in left or right) | Roll (in any direction) | Roll (in circular direction) |
| Microphone | Pitch, volume, speech | Pitch, volume, speech | Pitch, volume, speech | Pitch, volume, speech |
| Soft Keys | Button | Button | Button | Button |

According to yet other embodiments, a sideway slide gesture (e.g. by fingers may move the panoramic street view sideways, a pinch-in gesture may cause a zoom-out from the panoramic street view, and a pinch-out gesture may cause a zoom-in to the panoramic street view. Furthermore, the displayed view may automatically transition from a street side panoramic view to a circular panoramic view at a predefined zoom level.

According to further embodiments, rolling a trackball may slide the viewer along the street and enable the user to change the direction of the displayed street view by rotating the track ball to the right or left. Table 1 and 2, above, illustrate some example navigation techniques that may be used with a street view user interface according to embodiments.

Figure 3A:
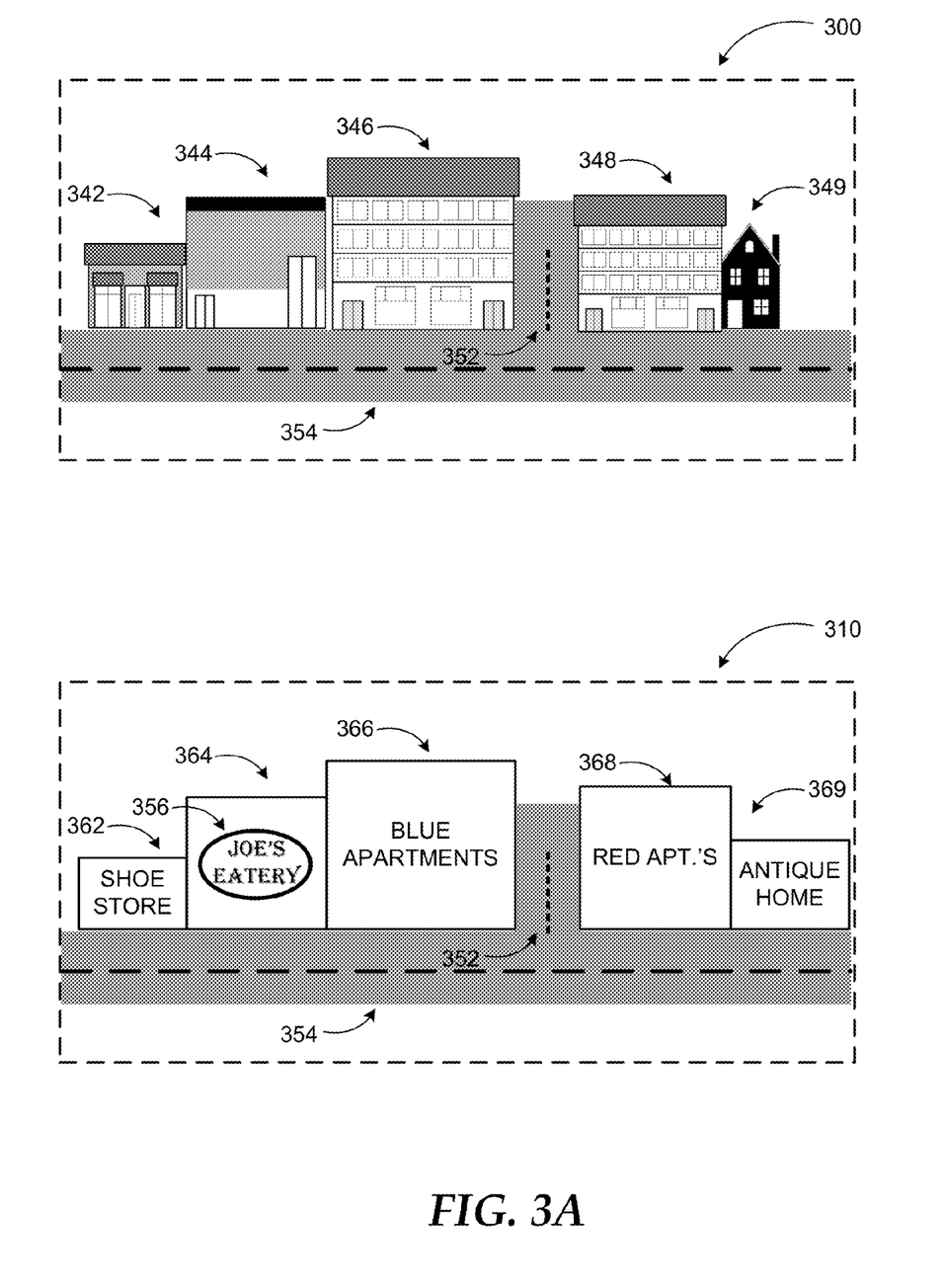
FIGS. 3A and 3B illustrate different example methods of temporary street view displays according to embodiments as images are retrieved from a service.
Figure 3B:
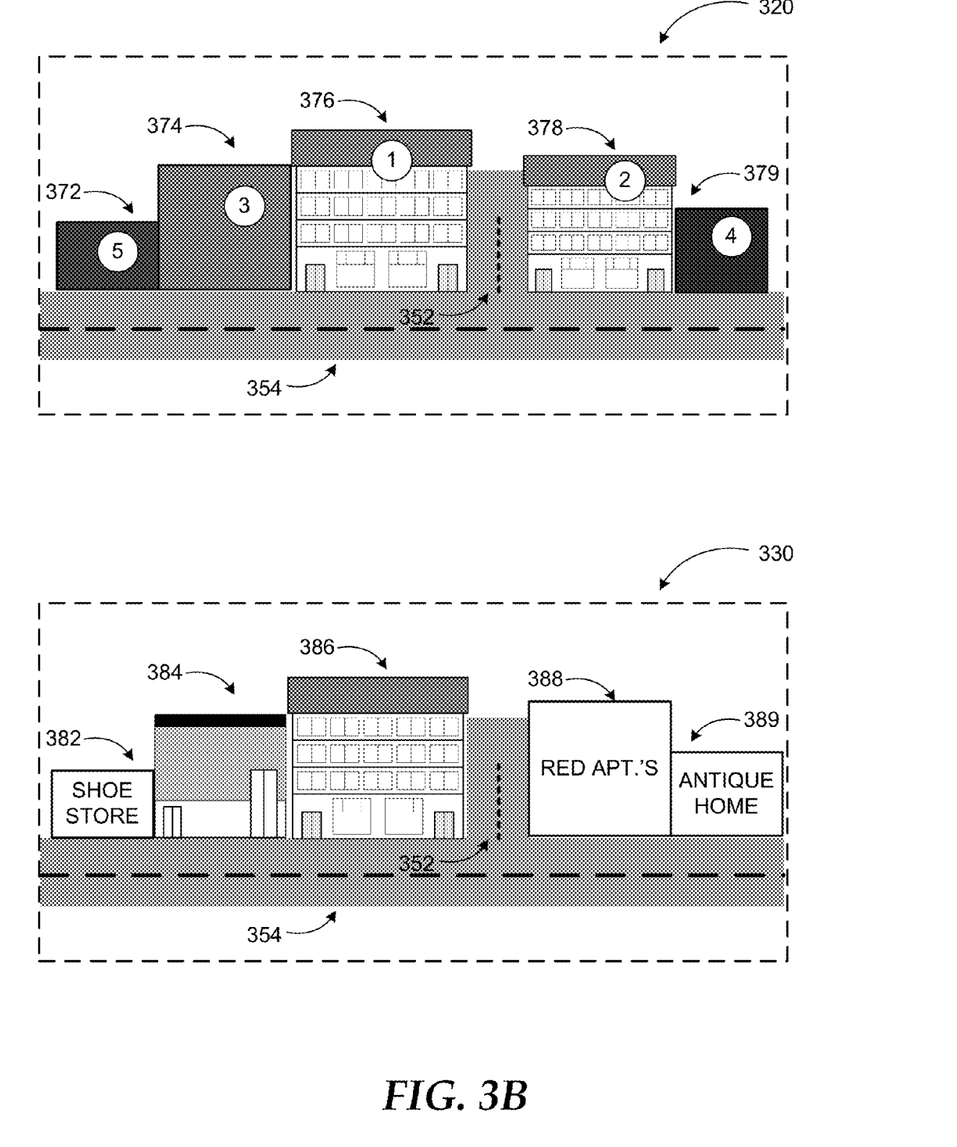

FIGS. 3A and 3B illustrate different example methods of temporary street view displays according to embodiments as images are retrieved from a service. Mobile devices communicate with servers providing mapping data, images, and other data via wireless networks such as various cellular networks, local area networks, wide area networks, and comparable ones. Characteristics such as bandwidth, processing power, etc. of such networks may vary depending on the network, location of the mobile device, network usage, and similar factors. Thus, retrieval of mapping data, especially street view images, is subject to delays based on network conditions. In addition, a network latency based on receipt of a request from the mobile device, queuing and processing by the server(s), and transmittal of the response adds an inherent delay regardless of network conditions. In some cases, the roundtrip latency for a mobile device may be up to 0.25 seconds. For these reasons, it is desirable to optimize image requests and mitigate delays through visual presentation means in order to avoid degradation of user experience.

According to some embodiments, network delays in retrieval of street view images may be mitigated by providing temporary supplemental views of the location as discussed in FIGS. 3A and 3B. According to other embodiments, image requests may be scheduled or streamed to streamline the retrieval instead of or in addition to the supplemental temporary views.

The panoramic views of a street view map may be represented with a tiled pyramid scheme, so that only those parts visible on the screen are downloaded. The pyramid levels may contain lower resolution versions of the highest resolution image. Alternatively, instead of storing low resolution copies, semantically rich copies of the information may be stored while maintaining highest rendering quality. For example, at the lowest level of the pyramid, instead of storing a low resolution image, the textual annotation of the nearby buildings may be stored. That way, the user may first see the annotations and text (e.g. no imagery or simple graphics). The text may be rendered at high fidelity with no loss of resolution. The text itself is more compact than even storing a low resolution image, and may be downloaded quickly.

Diagram 300 illustrates another example street view with buildings 342, 344, 346, 348, and 349 along street 354 with a cross street 352. According to an embodiment displaying textual annotations while the panoramic view images are being downloaded, the buildings may be replaced with text annotations 362, 364, 366, 368, and 369 as shown in diagram 310. The textual annotations may be displayed using a default font (and style) without any graphics or with simple graphics (e.g. vector representations of the buildings). The vector representations include typically small amounts of data, but yield high-resolution rendering.

According to other embodiments, additional descriptive indicators such as an approximate color of a building, a number of windows/doors of a building, and comparable features may be added to the textual annotations. For example, the boxes representing the buildings may be colored using representative colors similar to the actual colors of the building facades. Moreover, the textual annotations may be stylized. For example, the name of a business may be displayed using their logo (356).

According to further embodiments, data reducing approaches such as epitomes may be employed to display the buildings (and other structures). An epitome may be viewed as a miniature of an actual image. It has considerably smaller size, but preserves most of the constitutive components of the image. The epitome can be considered as a generative model of the patches of an image. Through the use of appropriate statistical methods an epitome may be extracted from an image, a collection of highly correlated images, or a video sequence (server side), and provided to the mobile device before requested actual images are transmitted.

Another mitigation approach for optimizing street view map rendering may include scheduling of the priority of the image requests. Image tiles that are centered and visible in the current view may be requested first. Then, depending on the mode, tiles from the 360° panorama or street view may be requested. According to yet other embodiments, the requests may be strung together into a single request so that only one latency effect is experienced for the entire rendering. This may be implemented employing a server-side service that takes multiple requests and returns a single stream containing all request images. It should be noted that any of the above discussed techniques may be combined to provide a high quality user experience in rendering street view maps.

Diagrams 320 and 330 illustrate combinations of the above described techniques. In diagram 320, image tiles are prioritized from the center toward the sides as shown by numbers 1, 2, 3, 4, 5 associated with each building assuming each image tile is associated with a building. In practice, an image tile may encompass multiple buildings. Thus, the actual images of buildings 376 and 378 are rendered first. While the image tiles for buildings 372, 374, and 379 are being retrieved, vector representations of the buildings (with or without color information) may be displayed. Diagram 330 shows a similar scenario, where an image tile corresponding to buildings 384 and 386 has been downloaded and rendered. As the image tiles corresponding to buildings 382, 388, and 389 are being retrieved, textual annotations are used to present information about the buildings.

Figure 4:
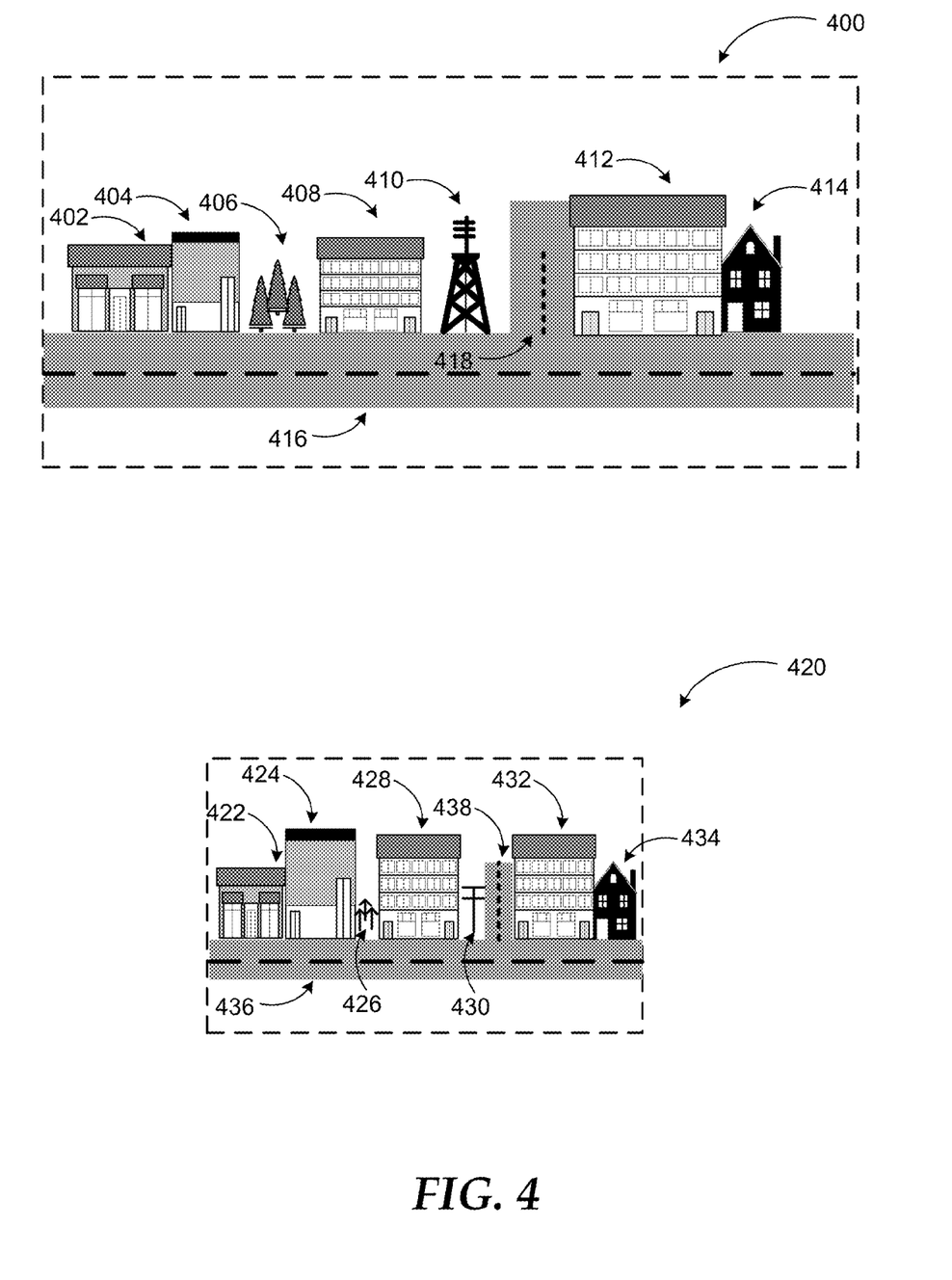
FIG. 4 illustrates another example approach for minimizing download resources for displaying street view images according to some embodiments.

FIG. 4 illustrates another example approach for minimizing download resources for displaying street view images according to some embodiments. Yet another approach for optimizing the rendering of street view maps despite network-based delays may include non-homogenic scaling, where an object of interest (e.g. a building or a business sign) may be displayed at a relatively high resolution, while other objects (trees, repeating windows, fences, etc.) are displayed with a scaled-down resolution. Thus, valuable bandwidth may be used for the important objects rather than using a fixed resolution for the entire street view.

Diagram 400 illustrates another example scene with features like buildings 402, 404, 408, 412, and 414 along street 416. Other features on the scene may include trees 406, transmission tower 410, and cross road 418. Of these features, the trees 406 and transmission tower 410 may be assumed not to be of interest for a viewer. Thus, in the street view map rendering of the same scene in diagram 420, high resolution images of the objects of interest (buildings 422, 424, 428, 432, and 434, street 436, and cross street 438) may be displayed. Objects of lesser interest (trees 426 and transmission tower 430) may be displayed in lower resolution or even in vector representation form reducing an amount of data to be retrieved from the server to the mobile device.

An additional approach for bandwidth saving may include shrinking "uninteresting" parts of the street images, such as empty spaces between houses, repeating patterns (such as showing only a few columns of a house, to show its nature, but not its full width). The resulting images may have a majority of the view information at smaller number of pixels, which is also better displayed on a limited size phone screen.

The different processes discussed in FIG. 4 such scheduling of image requests, combing requests into a single image stream, and combination of these techniques with other approaches may be performed at distinct hardware modules, software modules, or combinations of hardware and software. Furthermore, such modules may perform two or more of the processes in an integrated manner.

The example user interfaces, navigation methods, and rendering optimization techniques in FIG. 1 through 4 have been described with elements, processes, and actions. Embodiments are not limited to systems according to these example configurations. A system providing navigation on a street view map and optimization of street view rendering may be implemented in configurations employing fewer or additional components and performing other tasks. Furthermore, embodiments are not limited to mobile devices. The approaches discussed above may be implemented in any computing device using the principles described herein.

Figure 5:
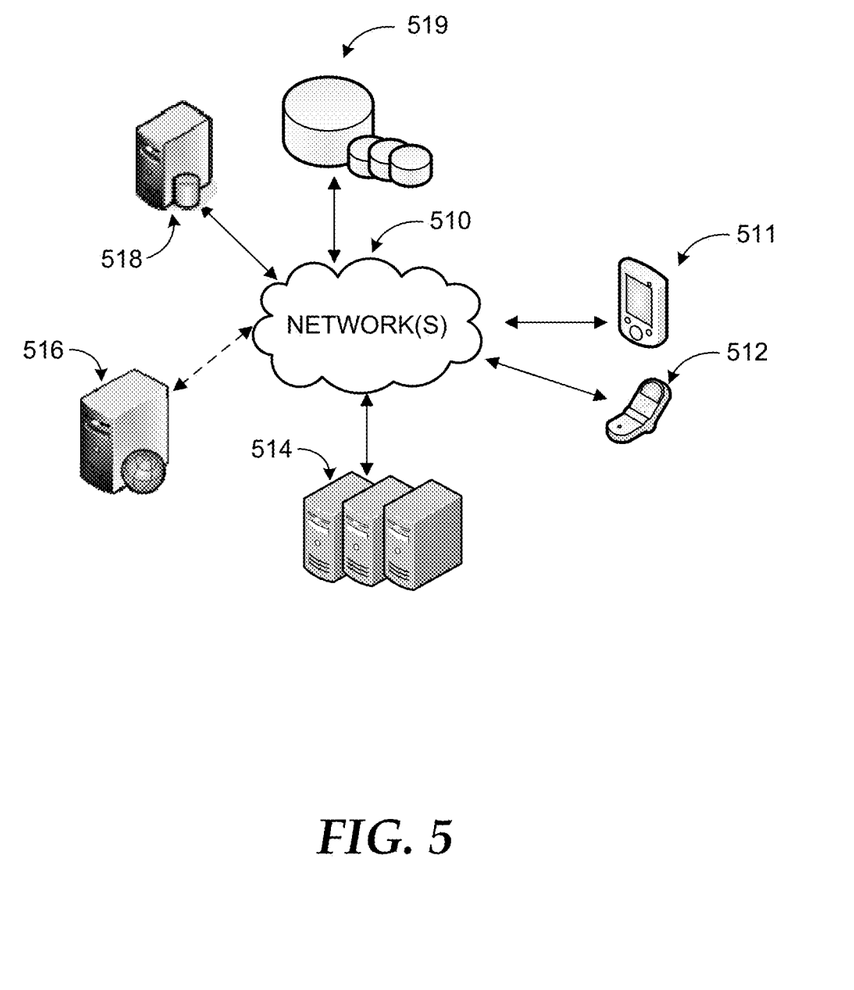
FIG. 5 is a networked environment, where a system according to embodiments may be implemented.

FIG. 5 is an example networked environment, where embodiments may be implemented. A platform for providing UI controls for navigating street view maps and management of image retrieval and presentation to mitigate communication delays may be implemented via software executed over one or more servers 514 such as a hosted service. The platform may communicate with client applications on individual mobile devices such as a smart phone 511, cellular phone 512, or similar devices ('client devices') through network(s) 510.

Client mapping applications executed on any of the client devices 511-512 may interact with a hosted service providing mapping services from the servers 514, or on individual server 516. The hosted service may provide requested images for street views based on scheduled requests or streaming to minimize effects of latency. Furthermore, client mapping applications on client device 511-512 may enable a user to navigate through the street views using intuitive navigation controls and supplement street views with text-based or other representations while requested images are being retrieved. Relevant data such as street view images and supplemental textual data may be stored and/or retrieved at/from data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also include (especially between the servers and the mobile devices) cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing mobile input mechanisms for navigating street view maps and mitigation of latency delays. Furthermore, the networked environments discussed in FIG. 5 are for illustration purposes only. Embodiments are not limited to the example applications, modules, or processes.

Figure 6:
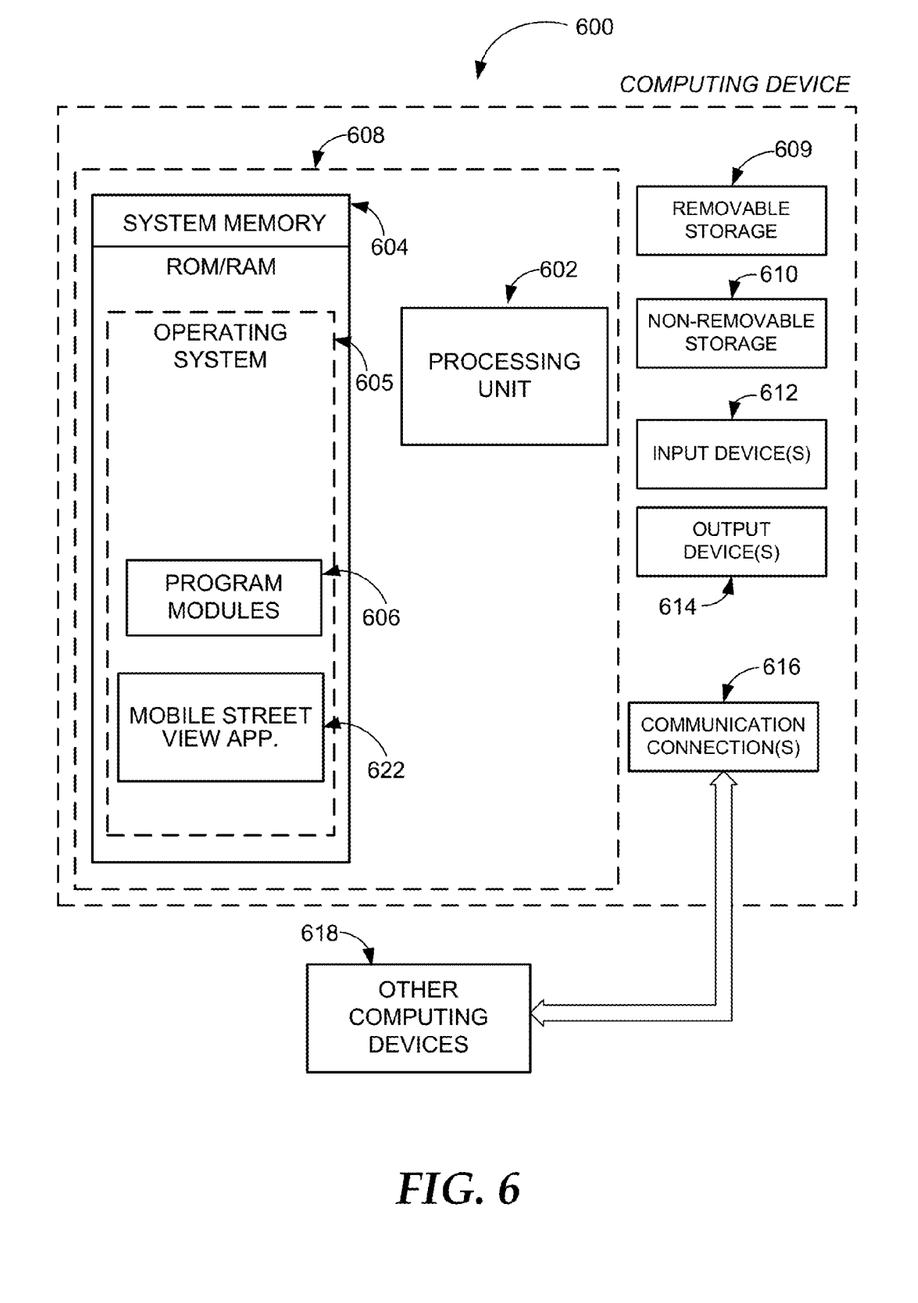
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be mobile computing/communication device capable of providing street view mapping services according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS MOBILE® operating systems from MICROSOFT CORPORATION of Redmond, Wash. or similar ones. The system memory 604 may also include one or more software applications such as program modules 606 and mobile street view application 622.

Mobile street view application 622 may receive mapping data and street view images from a service as discussed previously. The application may provide various input mechanisms such as gestures, use of integrated hardware like an accelerometer or a compass, audio, and/or video input to enable a user to navigate through various views. The application may further mitigate effects of communication-caused delays in retrieval of street images by employing techniques such as scheduling image requests, streaming image requests, data dependent scaling, and similar approaches. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
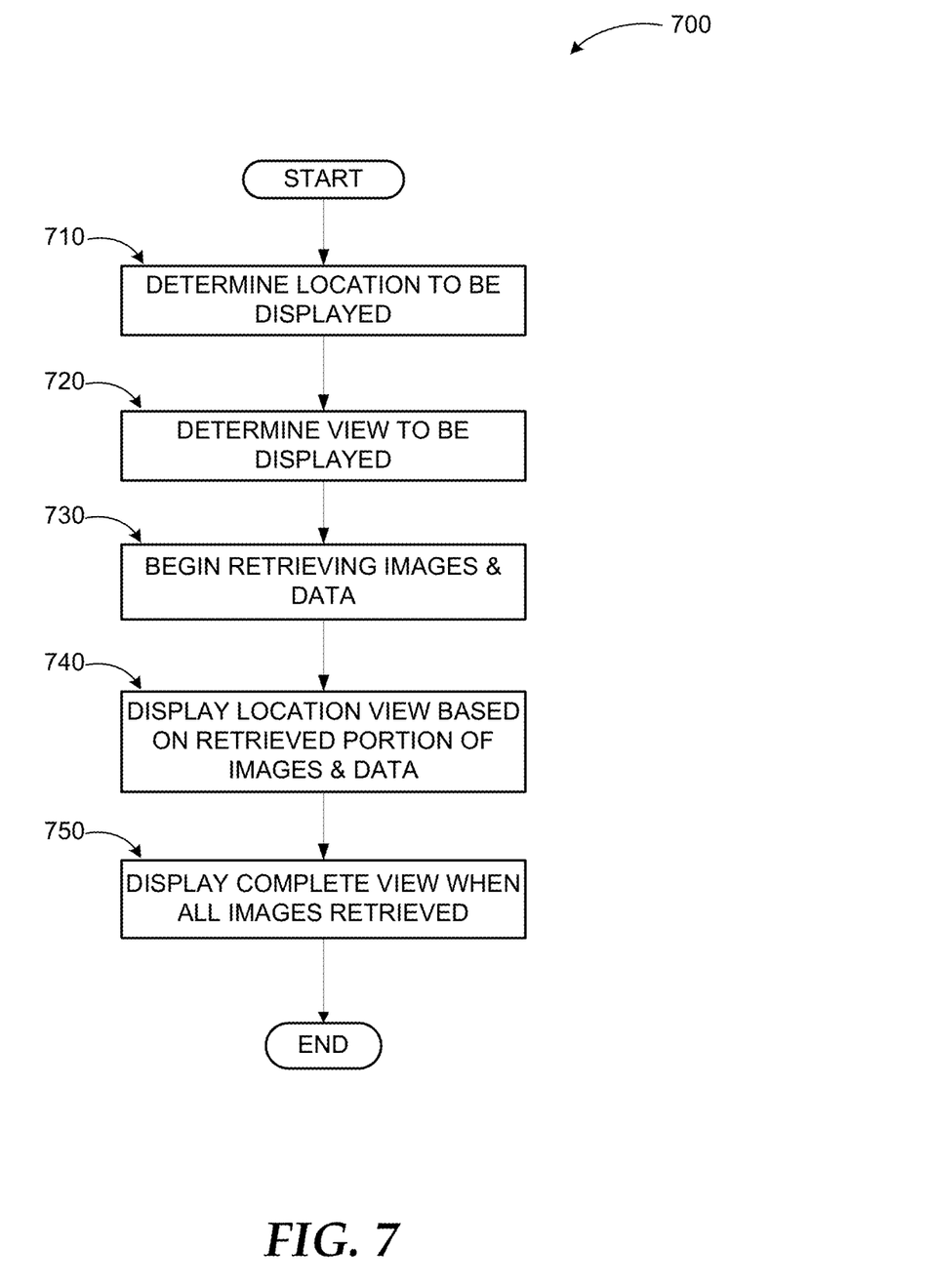
FIG. 7 illustrates a logic flow diagram for a process of providing adjustable and progressive mobile device street view according to embodiments.

FIG. 7 illustrates a logic flow diagram for process 700 of providing adjustable and progressive mobile device street view according to embodiments. Process 700 may be implemented as part of a mapping application executed on a mobile device.

Process 700 begins with operation 710, where a location to be displayed is determined based on user input or automatic computation such as based on a GPS system. At operation 720, a view to be displayed is determined. The view may also be determined based on user input or automatically based on various modules of the mobile device such as an accelerometer and/or compass. For example, the user may point the mobile device toward a particular side of the street, which may be determined as the view to be displayed.

At operation 730, the mobile device may begin retrieving images and data for displaying the street view. The image requests may be scheduled for optimal street viewing (e.g. image at the center of the view retrieved first, then others), streaming of the images requested, or similar techniques applied to mitigate delays due to communication bandwidth limitations and various forms of latency. For example, retrieval of images may be scheduled such that image tiles for a center of the panoramic street view are received with higher priority compared to image tiles for peripheries of the panoramic street view.

At operation 740, the mobile device may begin displaying the street view of the location based on retrieved potion of the images and data. Since all images may not be received yet, presentation techniques such as textual representation of buildings (and other street features), data dependent scaling, and similar ones may be used until all images are acquired by the mobile device as discussed previously.

At operation 750, the complete view based on retrieved images may be displayed when the retrieval of the images is complete. Processing may return to operation 710 or 720 based on a desired location change or a user input for changing the view to be displayed.

The operations included in process 700 are for illustration purposes. Providing street view as part of a mapping application with UI navigation methods and management of image retrieval and presentation may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for displaying a street view of a location on a mobile device, the method comprising:
    determining a location;
    determining a view of the location to be displayed;
    starting to retrieve images and data associated with the view to be displayed;
    displaying a temporary supplemental view of the location until a complete panoramic street view is rendered, wherein the temporary supplemental view includes a textual annotation with graphics based on a feature in the complete panoramic street view, the graphics including a vector representation with at least one from a set of: an approximate color of a building and a number of windows of a building; and
    replacing the temporary supplemental view with a complete panoramic street view of the location upon completion of the retrieval of images and data.

2. The method of claim 1, wherein the images are retrieved by scheduling image requests such that image tiles for a center of the panoramic street view are received with higher priority compared to image tiles for peripheries of the panoramic street view.

3. The method of claim 1, wherein the images are retrieved by combining individual image requests associated with image tiles into a single request to be streamed to the mobile device.

4. The method of claim 1, wherein the textual annotation includes one of: a textual description in a default font and a stylized description for each structure in the temporary supplemental view.

5. The method of claim 1, further comprising:
    enabling a user to navigate through the panoramic street view based on at least one from a set of: a touch based gesture, a camera based input, a compass based orientation change, an accelerometer based position change, a trackball motion, an audio input, and a soft key input.

6. The method of claim 5, wherein the touch based gesture includes one of: a sideway slide gesture to move the panoramic street view sideways, a pinch-in gesture to zoom out the panoramic street view, and a pinch-out gesture to zoom in to the panoramic street view.

7. The method of claim 6, further comprising:
    automatically transitioning from a street side panoramic view to a circular panoramic view at a predefined zoom level.

8. The method of claim 5, wherein the touch based gesture further includes one of: a single up-down gesture to perform a u-turn, a double-finger split up-down motion for revealing two sides of a street, a dragging motion in a turn arc to move down cross streets, and an area based gesture.

9. The method of claim 5, wherein enabling the user to navigate through the panoramic street view further comprises:
    enabling the user to take a snapshot of a location beyond the street view; and
    navigate through the snapshot through at least one from a set of: touch based gestures, trackball motions, soft key inputs, and audio inputs.

10. The method of claim 1, wherein the location is determined based on at least one from a set of: a user input, a Global Positioning Service (GPS) based input, a cellular tower triangulation based input, and a wireless data network location, and wherein the panoramic street view is determined based on at least one from a set of: a user input, a camera based input, a compass based input, an accelerometer based input, a touch based input, a trackball based input, and a microphone based input.

11. A mobile device for displaying a panoramic street view of a location, the mobile device comprising:
    a communication module;
    a display;
    a processor, the processor configured to execute a mapping application,
    wherein the mapping application is adapted to:
    determine a location;
    determine a view of the location to be displayed;
    start to retrieve images and data associated with the view of the location to be displayed;
    string requests for the images together into a single request so that one latency effect is experienced for entire rendering;
    display a temporary supplemental view until a complete panoramic street view is rendered, wherein the temporary supplemental view includes a textual annotation with graphics based on a feature in the complete panoramic street view, the graphics including a vector representation with at least one from a set of: an approximate color of a building and a number of windows of a building;
    enable a user to navigate through the displayed temporary supplemental view based on at least one from a set of: a touch based gesture, a camera based input, a compass based orientation change, an accelerometer based position change, a trackball motion, an audio input, and a soft key input; and
    replace the temporary supplemental view with a complete panoramic street view of the location upon completion of the retrieval of images and data.

12. The mobile device of claim 11, wherein the mapping application is further configured to retrieve semantically rich data associated with the view of the location to generate the temporary supplemental view.

13. The mobile device of claim 12, wherein the semantically rich data includes logos for businesses in the panoramic street view, and the mapping application is further configured to display the logos until the complete panoramic street view is rendered upon completion of the retrieval of data.

14. The mobile device of claim 11, wherein the mapping application is further configured to render the panoramic street view employing non-homogenic scaling by retrieving images for structures of interest at a high resolution and images for other structures at a scaled-down resolution.

15. A computer-readable memory device with instructions stored thereon for displaying a panoramic street view of a location on a mobile device, the instructions comprising:
    determining a location based on at least one from a set of: a user input, a Global Positioning Service (GPS) based input, a cellular tower triangulation based input, and a wireless data network location;
    determining a view of the location to be displayed based on at least one from a set of: a user input, a camera based input, a compass based input, an accelerometer based input, a touch based input, a trackball based input, and a microphone based input;
    starting to retrieve images and data associated with the view of the location to be displayed by stringing requests for the images together into a single request so that one latency effect is experienced for entire rendering;

displaying a temporary supplemental view of the location until a complete panoramic street view is rendered, wherein the temporary supplemental view includes a textual annotation with graphics based on a feature in the complete panoramic street view, a descriptive indicator of the feature in the complete panoramic street view, the graphics including a vector representation with at least one from a set of: an approximate color of a building and a number of windows of a building;

enabling a user to navigate through the temporary supplemental view of the location based on at least one from a set of: a touch based gesture, a camera based input, a compass based orientation change, an accelerometer based position change, a trackball motion, an audio input, and a soft key input; and replacing the temporary supplemental view of the location with a complete panoramic street view of the location upon completion of the retrieval of images and data.

16. The computer-readable memory device of claim 15, wherein the instructions further comprise:

employing data retrieval optimization for the retrieval of images, the optimization comprising:

scheduling image retrieval requests such that image tiles for a center of the panoramic street view are received with higher priority compared to image tiles for peripheries of the panoramic street view.

17. The computer-readable memory device of claim 16, wherein the instructions further comprise:

combining the data retrieval optimization with the temporary supplemental view based rendering of the panoramic street view.

* * * * *